United States Patent [19]
Heinze et al.

[11] 3,854,887
[45] Dec. 17, 1974

[54] REACTOR SYSTEM FOR GRAVITY-FLOWING CATALYST PARTICLES

[75] Inventors: Walter W. Heinze, Chicago; Edward Schnitta, Bensenville, both of Ill.

[73] Assignee: Universal Oil Products Company, Des Plaines, Ill.

[22] Filed: Feb. 20, 1973

[21] Appl. No.: 333,933

[52] U.S. Cl............. 23/288 G, 23/288 R, 208/165, 208/169
[51] Int. Cl............................................. B01j 9/12
[58] Field of Search ......... 23/288 G, 288 B, 288 C, 23/288 R, 289; 208/165, 169, 173, 174

[56] References Cited
UNITED STATES PATENTS

| | | | |
|---|---|---|---|
| 2,108,087 | 2/1938 | Thayer | 23/288 R |
| 2,363,623 | 11/1944 | Roach et al. | 23/288 R |
| 2,398,546 | 4/1946 | Messmore | 23/288 R |
| 2,745,722 | 5/1956 | Lacoste | 23/288 R |
| 3,791,795 | 2/1974 | Pan et al. | 23/288 R |
| 2,212,583 | 8/1940 | Broderson et al. | 23/288 R |
| 2,276,356 | 3/1942 | Velykis | 23/288 L |

Primary Examiner—Joseph Scovronek
Attorney, Agent, or Firm—James R. Hoatson, Jr.; Robert W. Erickson; William H. Page, II

[57] ABSTRACT

A catalytic reactor system which provides contact between a reactant stream and gravity-flowing catalyst particles. The improvement herein described is applicable to a single reaction zone system, a "stacked" multiple reaction zone system and a "side-by-side" multiple reaction zone system. The reactor is designed for lateral, radial flow of the reactant stream through the gravity-flowing catalyst zone while simultaneously preventing the migration of catalyst particles into the outer reactant conduit.

7 Claims, 5 Drawing Figures

PATENTED DEC 17 1974

REACTOR SYSTEM FOR GRAVITY-FLOWING CATALYST PARTICLES

APPLICABILITY OF INVENTION

The reactor system of the present invention is intended for utilization in the catalytic conversion of a reactant stream. More particularly, our inventive concept encompasses a reactor system which provides radial-flow contact of a reactant stream with catalyst particles which are movable through the system via gravity flow, and is specifically directed toward the vapor-phase conversion of hydrocarbon streams. The present invention may be advantageously employed in (i) single-stage reaction systems, (ii) multiple-stage processes wherein the reactant stream flows serially through two or more reaction chambers situated side by side and, (iii) a multiple-stage, stacked reactor system.

The improved reactor apparatus, herein described, provides for the retention of downwardly-moving catalyst particles disposed in an annular-form section through which the reactant stream flows laterally and radially to afford the most advantageous, technically-sound contact between the reactant stream and the catalyst particles. Tubular-form sections, of varying nominal, internal cross-sectional areas, are vertically and co-axially disposed to form the reactor system. Briefly, the system comprises a reaction chamber containing a coaxially-disposed, catalyst-retaining screen, having a nominal internal cross-sectional area less than said chamber, and a perforated centerpipe having a nominal, internal cross-sectional area less than the catalyst-retaining screen. The reactant stream is introduced, preferably in vapor phase, into the annular-form space between the inside wall of the reaction chamber and the outside of the catalyst-retaining screen. The latter forms an annular-form catalyst-holding zone with the outside surface of the perforated centerpipe; vaporous reactant flows laterally and radially through the screen and catalyst zone into the centerpipe and out of the reaction chamber. Judicious design and operating considerations obviously require that the openings both in the centerpipe and the catalyst-retaining screen be sized to restrict the passage therethrough of catalyst particles. Furthermore, although the tubular-form configuration of the various components may take any suitable shape — i.e. triangular, square, oblong, diamond, etc. — many design, fabrication and operating considerations indicate the advantages of utilizing those components which are substantially circular in cross-section.

Candor compels recognition of the fact that various types of processes utilize multiple-stage reactor systems, either in side-by-side configuration, or as a vertically-disposed stack. Such systems, in petroleum refining technology, have been employed in a wide variety of hydrocarbon conversion processes, including catalytic reforming, fixed-bed alkylation, hydrorefining, hydrocracking, dehydrogenation, hydrogenation, steam reforming, etc. Many of these processes, such as dehydrogenation, desulfurization, etc., have traditionally employed a single fixed-bed catalytic reaction system. In the interest of brevity, and not with the intent of specifically limiting our invention beyond the scope and spirit of the appended claims, the following discussion will be primarily directed toward the catalytic reforming of naphtha fractions. It is understood, however, that the reactor system stemming from our inventive concept affords a distinct improvement in such processes where characterized by gravity-flowing catalyst particles.

Historically, the catalytic reforming process, utilizing a catalytic composite of a Group VIII noble metal component combined with a refractory inorganic oxide, was effected in a non-regenerative, fixed-bed system of a plurality of reaction zones in side-by-side relation. When the catalytic composite had become deactivated to the extent that continued operation was not economically feasible, the system was shut down, and the catalyst regenerated in situ. After several such regenerations, the catalyst was replaced and the deactivated catalyst subjected either to an exotic reconditioning technique, or to an involved method for recovering the precious noble metal. Of more recent vintage was the so-called "swing-bed" system in which an extra reactor was substituted for one which was due to be placed off-stream for regeneration purposes. This swing-bed system gained wide acceptance, notwithstanding the required increase in catalyst inventory, in view of the fact that the entire unit was not caused to be shut down except for major operational upsets, or periodic turn-arounds for maintenance purposes. Inherently, however, the swing-bed system possesses the disadvantage of sudden replacement of an entire zone of deactivated catalyst with freshly regenerated catalyst, thereby resulting in operational upsets with respect to steady, lined-out conditions, as well as product yields and quality.

Still more recently, a "stacked" reactor system has been provided in which the catalyst particles flow, via gravity, downwardly from one annular-form catalyst zone into another. Ultimately, the catalyst is transferred to a suitable regeneration system, preferably also functioning with a downwardly moving bed of catalyst. Actually, the catalyst particles are maintained in the reactor system, and transferred from one section to another in such a manner that the flow of particles may be continuous, at frequent intervals, or at extended intervals, with the movement being controlled by the rate of catalyst withdrawal from the last of the series of individual zones.

Illustrative of a reaction system wherein the reactant is caused to flow laterally and radially through the system, is that described in U.S. Pat. No. 2,683,654 (Cl. 23-288). The reactor shown is intended for the common fixed-bed systems wherein the catalyst is either subjected to in situ regeneration, or replaced. The reactant stream flows from an outer annular-form space, through a catalyst-retaining screen and catalyst particles disposed in an annular space, and into a perforated centerpipe, through the bottom of which it emanates from the reacton chamber.

U.S. Pat. No. 3,470,090 (Cl. 208-138) illustrates a side-by-side process, with intermediate heating of the reactant stream. Catalyst withdrawn from a reaction zone is sent to suitable regeneration facilities, rather than to the next succeeding reaction zone. The stacked catalytic reforming configuration is shown in U.S. Pat. No. 3,647,680 (Cl. 208-65) as a two-stage system with an integrated regeneration system. These latter two techniques utilize a downwardly-moving bed of catalyst particles through which the reactant stream flows. Significant improvements are achieved, with these types of movable catalyst systems, especially with respect to the optimum reactant/catalyst contacting conditions and the period of time during which the system functions mechanically in an economically acceptable fashion.

OBJECTS AND EMBODIMENTS

A principal object of our invention is to provide an improved catalytic reactor system for contacting a reactant stream with catalyst particles movable through said system by gravity flow. A corollary objective involves the construction and the arrangement of a plurality of stacked, or side-by-side, annular-form reaction zones in a system wherein the catalyst particles are movable via gravity flow.

A specific object of the present invention is to prevent the migration of catalyst particles from an annular-form, catalyst-holding zone into other annular-form zones of the overall system.

Therefore, in a broad embodiment, the present invention is directed toward a catalytic reactor system providing contact of a reactant stream with catalyst particles movable through said system by gravity flow, which system comprises, in combination: (a) an elongated, vertically-disposed reaction chamber having disposed therein; (b) a tubular-form, catalyst-retaining screen, coaxially distended substantially the entire length of said chamber, and having a nominal internal cross-sectional area less than said chamber to provide a reactant annulus; (c) a tubular-form, perforated centerpipe, coaxially distended substantially the entire length of said chamber, and having a nominal internal cross-sectional area less than catalyst retaining screen to provide an annular-form catalyst-holding zone; (d) a tubular-form, catalyst-retaining screen support member attached at its lower end to a bottom portion of said chamber and movably connected at its upper end to the lower end of said catalyst-retaining screen; (e) a tubular-form dam attached to said screen support member, coaxially distended a finite distance above the movable connection between said catalyst-retaining screen and said screen support member, and a finite distance below the upper portion of said chamber, and having a nominal internal cross-sectional area less than said catalyst-retaining screen and greater than said centerpipe, to provide a semi-closed annulus within the lower portion of said catalyst-holding zone; and, (f) particulate refractory matter of a size larger than said catalyst particles, disposed within said semi-closed annulus to a height above the movable connection.

In another embodiment, the reaction chamber, catalyst-retaining screen, screen support member, dam and centerpipe are all substantially circular in cross section. In a specific embodiment, said particulate matter is disposed in multiple layers of varying size, with the size decreasing as the height of the particulate matter increases.

These, as well as other objects and embodiments will become evident from the following more detailed description of our invention.

SUMMARY OF INVENTION

As hereinbefore set forth, the apparatus of the present invention is suitable for use in a multitude of hydrocarbon conversion processes, and especially those which are effected in vapor phase. Although the following discussion is primarily directed toward the catalytic reforming of naphtha fractions, and/or distillates, there is no intent to so limit the present invention. Catalytic reforming, as well as the other processes previously set forth, have gone through several development phases which have currently terminated in a system in which the catalyst particles are in the form of a descending column in one or more reactor vessels. Typically, the catalysts are utilized in spherical form having a nominal diameter ranging from about one thirty-second inch to about one-eighth inch in order to afford free-flow characteristics which will not bridge, or block the descending column, or columns of catalyst, within the overall system. In one such multiple system, the reaction chambers are vertically stacked, and a plurality of relatively small diameter transfer conduits are employed to transfer catalyst particles from one reaction zone to another. In order to facilitate and enhance gravity flow of the particles from one zone to another, it is particularly important that the catalyst particles have a small diameter, and one which is preferably less than about one-eighth inch.

With respect to the catalytic reforming of hydrocarbons, in a vapor-phase operation, conditions include catalyst temperatures in the range of about 700°F. to about 1,000°F.; cautious techniques generally dictate that catalyst temperatures not substantially exceed a level of about 1020°F. Other conditions include a pressure from about 50 psig. to about 1,000 psig., a liquid hourly space velocity of from 0.2 to about 10.0 and a hydrogen to hydrocarbon mole ratio from about 1.0:1.0 to about 10.0:1.0. The present inventive concept is particularly adaptable to low-pressure operations — i.e. from about 50 psig. to about 200 psig. Since catalytic reforming reactions are principally endothermic in nature, the multiple-stage system will employ interstage heating of the effluent from a preceding zone, prior to the introduction thereof into the next succeeding zone. Catalytic reforming reactions are effected through the use of a Group VIII noble metal combined with a halogen component and a suitable porous carrier material; with respect to the latter, alumina is generally preferred. Recent investigations have indicated that more advantageous results are enjoyed through the cojoint use of a catalytic metallic modifier; these are gnerally selected from the group of rhenium, germanium, tin, titanium, vanadium, and various mixtures thereof.

In annular-form reaction chambers, of the type hereinbefore described, the catalyst-retaining screen and perforated centerpipe are constructed of narrower-gauge metallic material than the outer shell, or reaction chamber. With respect to the catalyst-retaining screen especially, design considerations dictate the use of different metal alloys. For example, the outer shell reaction chamber may be constructed of 1.25% chrome steel, while the retaining screen is fabricated from 18–8 stainless steel. These different types of materials have varying expansion and contraction characteristics. If the retaining screen is directly and immovably connected to the lower portion of the reaction chamber, the varying expansion and contraction characteristics produce severe warping of the retaining screen with the result that permanent damage occurs. Furthermore, the optimum flow characteristics of the reactant stream through the descending zone of catalyst particles, is adversley affected. Likewise, the desired uniformity in the flow of catalyst particles downwardly through the reactor system is virtually completely destroyed.

This particular problem is resolved by providing a catalyst-retaining screen support member, immovably attached at its lower end to the reactor chamber, and movably connected at its upper end to the catalyst-retaining screen. The support member is generally of the same alloy steel as the reaction chamber, but different from the catalyst-retaining screen. This movable connection effectively takes up the effects of expansion and contraction, and thus prevents the deleterious warping of the screen. The movable connection between the screen and the support member can be fabricated in many suitable ways. For example, the connection may be made through the use of a flange-faced slip-joint, the lower face of which contains guide bars, which permit lateral motion, to a degree short of complete disconnection. The guide bars can be eliminated, for ease in flange fabrication, and replaced with a shoulder or machine bolt. Regardless, the preferred movable connection constitutes a slip-joint in the form of ring flanges.

While affording the solution to the screen-warping problem, the ring flange slip-joint gives rise to another. The interior edges of the flanged slip-joint protrude into the catalyst-holding annular space, and tend to part in a manner which creates a passageway of a size capable of permitting leakage of catalyst through the joint and into the reactant annulus. The velocity of the reactant vapors is sufficient to churn these catalyst particles until they eventually become powdered. As the quantity of "leaked" catalyst increases, the effect becomes compounded. The powdered catalyst is actually carried upwards the entire length of the reactant annulus, due to the high vapor velocity, with the result that the screen openings become plugged. Obviously this destroys the desired flow pattern of the reactant stream, and eventually gives rise to a complete unit shut-down. In several instances when a unit was down for this reason, or any other, inspection of the catalyst-retaining screen indicated that the outside surface was plugged to the extent of from 10 to 30 percent.

In accordance with the present invention, the interior edges of the flanged slip-joint (which edges protrude into the catalyst-holding annulus), are "sealed" with particulate refractory matter of a size larger than the catalyst particles. The seal is formed by providing a tubular-form dam, preferably perforated to allow vapor flow, attached to the screen support member. The height of the perforated dam should be above the movable connection and, of course, above the level of particulate refractory matter. Thus, where the height of the latter, measured for instance from the bottom of the reaction chamber, is about 1.1 to about 2.0 times the distance to the slip joint, the dam will extend upwards about 1.5 to about 3.0 times the distance to the slip-joint. The dam may be fabricated from the same material as the catalyst-retaining screen, and take the same size and shape, or be similar to the center-pipe.

Any particulate matter which is sufficiently hard to withstand the buffeting of the high velocity reactant vapors is suitable for use as the sealant. It may take any form such as berl saddles, rings, cylinders, cakes, briquets, etc., the only limitation being the size. A preferred sealant is one which is ceramic, and thus heat resistant, as well as the extremely hard, and which has a substantially spherical shape. Although the sealant, for example, ceramic spheres, may be used in uniform size, it is preferred to employ layers, the size of which decreases as the overall height increases. Thus, in the situation where the catalyst particles are spheres having a nominal diameter of one-sixteenth inch, the ceramic balls will be disposed in layers having sizes of three-eighths inch, one-fourth inch and one-eighth inch, or other sizes deemed necessary to prevent the migration of catalyst particles.

In further describing our invention, as employed in a process wherein a reactant stream contacts catalyst particles which are movable through the reactor system by gravity flow, and the problem solved through the use thereof, reference will be made to the accompanying drawings. Briefly, these drawings are as follows.

For the purposes of this illustration, and the further explanation thereof, it will be pressumed that all the component parts are substantially circular in cross-sectional area.

DETAILED DESCRIPTION OF DRAWINGS

Figure 1:
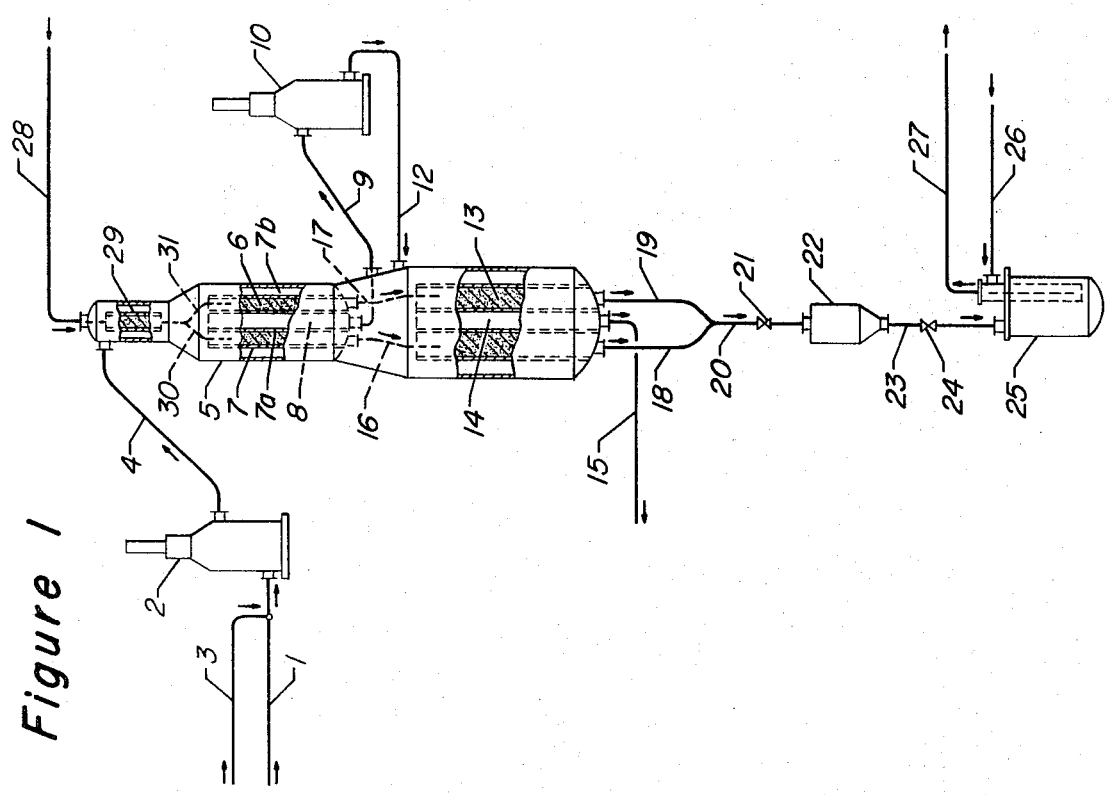
FIG. 1 is a diagrammatic, partially-sectioned elevational view of a stacked, two-stage reactor system.

Referring now to FIG. 1, a two-reactor, stacked reaction system is shown. In effect, the system will have a common catalyst bed moving as a substantially unbroken column of particles from the top of reactor 5 therethrough into and through reactor 11, being withdrawn therefrom and transported to suitable regeneration facilities (not illustrated), while regenerated catalyst is introduced into the top of reactor 5; thus, the catalyst will be regenerated with both reactors remaining onstream at reforming conditions. In an illustrative operation, a straight-run naphtha fraction — i.e. 200°F. –400°F. — is introduced into the process by way of line 1, at a liquid hourly space velocity of about 2.0, and enters heater 2 in admixture with recycled hydrogen from line 3. The hydrogen to hydrocarbon mole ratio is about 3.0:1.0, the pressure is about 200 psig., and heater 2 increases the temperature of the reactant stream mixture to a level of about 950°F., the heated mixture being discharged via line 4 into the upper portion of reactor 5. The reforming catalyst is in the form of 1/16 inch spheres, and is a composite of alumina, 0.375 percent by weight of platinum, 0.375 percent by weight of tin and 0.9 percent by weight of combined chlorine.

The narrower upper portion of reactor 5 will be hereinafter described with reference to the incoming regenerated catalyst in line 28. Reactor 5 is shown as having the catalyst confined in an annular moving bed 6 which is formed by catalyst-retaining screen 7 and perforated centerpipe 7a. Similarly, retaining screen 7 forms an annular space 7b with the interior wall of reactor 5. The vapors exit catalyst bed 6 through perforated centerpipe 7a, and continue downwardly through cylindrical space 8. Since reforming reactions are principally endothermic in nature, the vapors leaving catalyst bed 6 will be at a temperature less than the inlet temperature of 950°F. They are, therefore, withdrawn through line 9 into heater 10 wherein the temperature is raised to 950°F. The heated stream is then introduced into the second reactor 11 via line 12.

Within reactor chamber 11, the reactant stream is passed in lateral, radial flow through annular catalyst bed 13 and downwardly through cylindrical space 14, to be withdrawn from the reaction chamber via line 15. The effluent withdrawn from reactor chamber 11 is passed into conventional separation facilities for the recovery of a high-octane reformate — i.e. having an unleaded octane rating above about 95.0 — and the recovery of a hydrogen-rich gas stream which is recycled to the system through line 3.

The downwardly-moving catalyst particles in reactor 5 are introduced into the annular bed 13 of reactor 11, by way of transfer conduits 16 and 17. These are but two of multiple catalyst transfer conduits — generally from about 6 to about 16 — which provide uniformity of flow characteristics as the catalyst passes from reactor 5 to reactor 11. A minimal, but suitable pressure drop is effected whereby substantially all the reactant vapors are directed through line 9, heater 10 and line 11, with a virtually insignificant quantity by-passing heater 10. In effect, the reactor system has a common catalyst bed moving downwardly as a substantially unbroken column of particles.

Catalyst particles are removed from reactor 11 via transfer conduits 18 and 19 at a rate such that the total catalyst inventory within the system is replaced in approximately 30-day cycles. The catalyst removed from the multiple transfer conduits, represented by conduits 18 and 19, is introduced via a common header 20, containing control valve 21, into lock-hopper 22 for separation therein of any residual hydrocarbons. The catalyst is subsequently transferred via line 23, containing control valve 24, to a lift engager 25. Nitrogen, or other suitable inert gas, from line 26 is employed to remove the used catalyst from lift engager 25 through line 27. In a completely integrated system, the catalyst in line 27 is transferred to the top of a regeneration facility.

Regenerated catalyst is returned to the system, in admixture with hydrogen, through line 28. Prior to direct contact with the reactant stream in reactor 5, the regenerated catalyst/hydrogen mixture is processed in a dense phase in reducing zone 29 to effect indirect heat-exchange with hot reactant vapors being charged to the reactor. The catalyst is processed downwardly in reduction zone 29 at a rate to establish a residence time of about 2 hours at a temperature of about 950°F. to about 1,000°F. The resulting reduced catalyst is thereafter added to catalyst bed 6 through transfer conduits 30 and 31, replacing that withdrawn from the system through lines 18 and 19.

Figure 2:
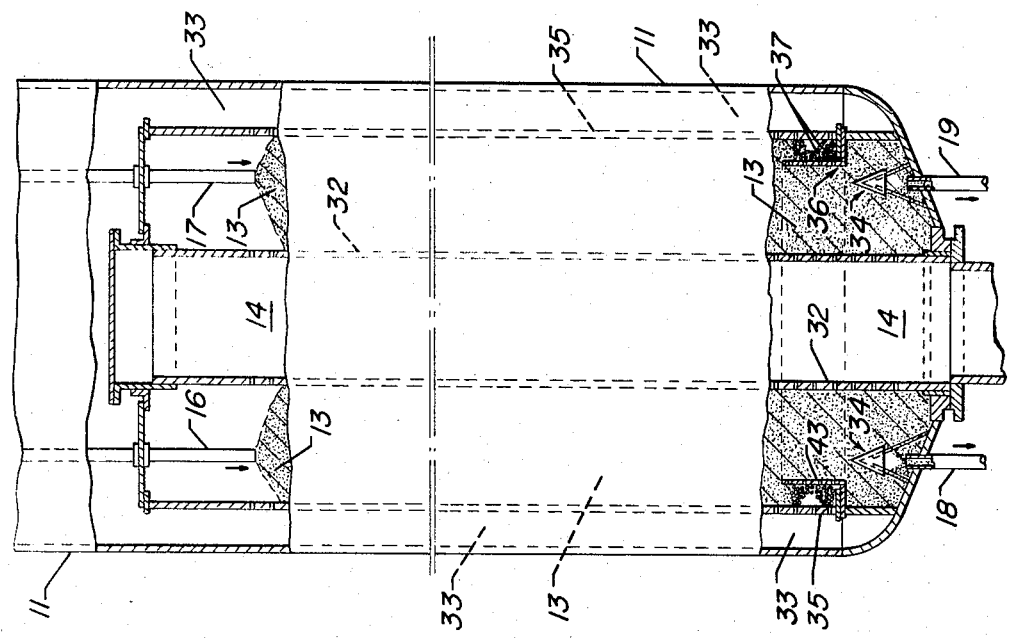
FIG. 2 is an enlarged sectional view of a portion of the second reaction stage indicated as 11 in FIG. 1.

FIG. 2 is an enlarged sectional view of a portion of the second reaction zone 11. The downwardly-moving catalyst particles are introduced into catalyst-holding zone 13 by way of transfer conduits 16 and 17. Annular zone 13 is formed by perforated centerpipe 32 and catalyst-retaining screen 35. Similarly, retaining screen 35 forms a reactant annulus 33 with the interior wall of reactor 11. As hereinbefore stated, the reactant stream flows laterally through retaining screen 35, radially through the catalyst in zone 13, through perforated centerpipe 32 and into area 14 through which it is removed from the reaction zone. Catalyst-retaining screen 35 is supported by screen support member 36 which includes, in this view, a ring flange slip-joint to absorb the heat effects. Uniformity of catalyst flow through catalyst transfer conduits, represented as 18 and 19, is enhanced by providing coolie-hats (including supports) 34 over each of the transfer conduits 18 and 19.

Figure 3:
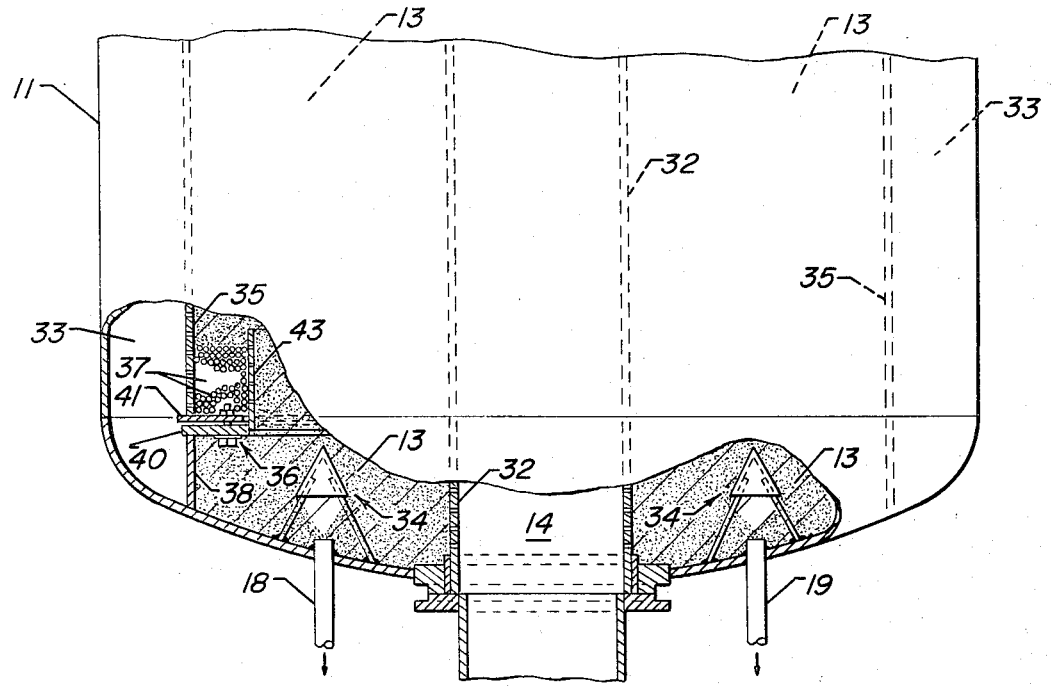
FIG. 3 is an enlarged sectional view of a portion of the bottom of the reaction system.

FIG. 3 is an enlarged sectional view of a portion of the bottom of reactor 11. Catalyst flows uniformly from annular space 13 through the support members for coolie-hat 34 into transfer conduit 18. Catalyst-retaining screen 35 is equipped at its lower end with ring flange 41 which forms a slip-joint with ring flange 40 of screen support member 38. In the illustration shown, the ring flanges are movably connected by means of shoulder bolt 42. As the process is effected, the interior edges (protruding into catalyst annulus 13) of ring flanges 40 and 41 tend to warp and form an opening through which catalyst particles leak into reactant annulus 33. The vapor velocity of the reactant stream is such that these catalyst particles are churned and broken to the extent that they plug the reactant annulus side of screen 35. This catalyst migration is prevented, as shown in this FIGURE, by attaching a tubular-form dam 43 to ring flange 40 of screen support member 38. It is noted that a semi-closed annulus, or dike, is formed between catalyst-retaining screen 35 and dam 43, the closure at the lower portion thereof being provided by the slip-joint 36. Particulate refractory matter 37, herein illustrated as substantially spherical ceramic balls, is placed within the semi-closed annulus to a height above the slip-joint connection, but below the top edge of dam 43.

Figure 4:
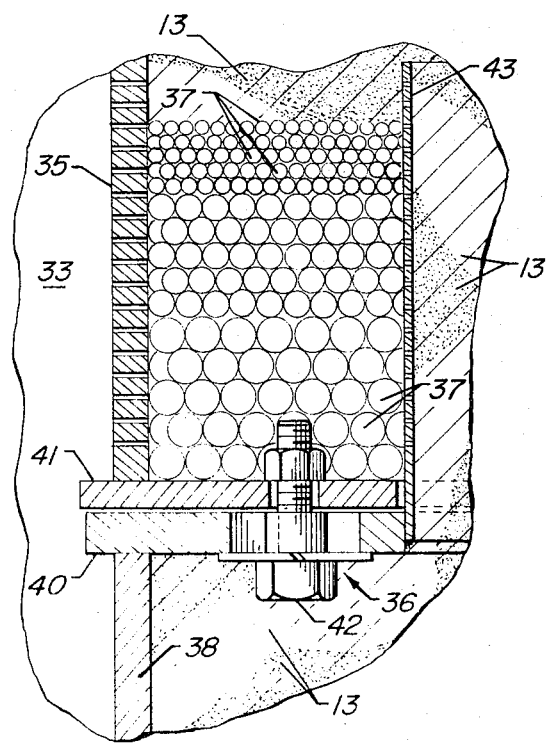
FIG. 4 is a sectioned view of the slip-joint detail showing the ring flanges of the retaining screen and screen support member movably connected by a shoulder or machine bolt.

FIG. 4 is a sectioned view of the slip-joint detail showing the ring flanges 40 and 41 movably connected by shoulder bolt 42. Also illustrated is the disposition of ceramic balls 37 in layers of varying size which decreases as the height increases.

Figure 5:
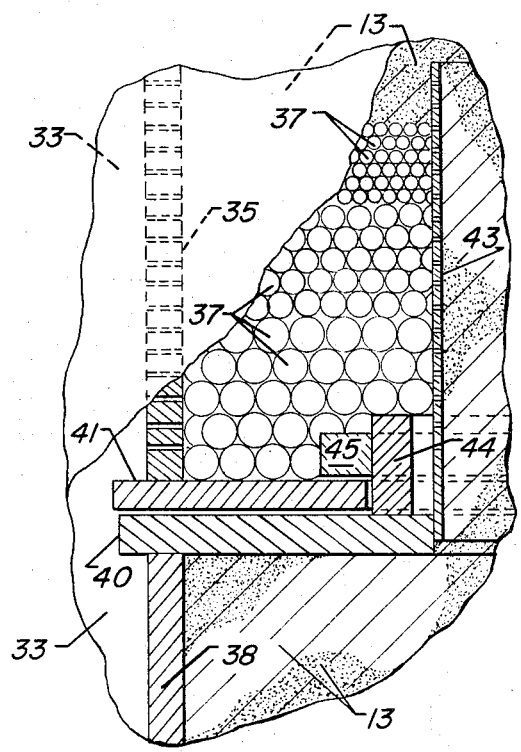
FIG. 5 is a sectioned view of the slip-joint detail showing the ring flanges of the retaining screen and screen support member movable connected through the use of guide bars.

FIG. 5 is a detailed sectioned view of a different embodiment contemplated for the slip-joint connection. Guide bar 45 is attached to guide bar 44 which, in turn, is attached to ring-flange 40, thus providing the movable passageway for ring-flange 41.

The warped and spread slip joint is effectively sealed to prevent the migration of catalyst particles into the reactant annulus. There is afforded a significantly reduced degree of plugging of the catalyst-retaining screen and an extension of the period during which the reactor system functions efficiently.

We claim as our invention:

1. A catalytic reactor system for reacting a reactant stream to obtain a product stream by contact of the reactant stream with catalyst particles movable through said system by gravity flow, which system comprises, in combination:

a. an elongated, vertically-disposed reaction chamber having an inlet in the upper portion thereof for said reactant stream, an outlet in the lower portion thereof for said product stream, an inlet in the upper portion thereof for said catalyst particles, and an outlet in the lower portion thereof for said catalyst particles, said chamber having disposed therein;

b. a tubular-form catalyst-retaining screen having a ring flange at its lower end, coaxially distended substantially the entire length of said chamber, and having a nominal internal cross-sectional area less than said chamber to provide a reactant annulus in communication with said reactant stream inlet and product stream outlet;

c. a tubular-form, perforated centerpipe, coaxially distended substantially the entire length of said chamber, and having a nominal internal cross-sectional area less then said catalyst-retaining screen to provide an annular catalyst-holding zone in communication with said catalyst particle inlet and outlet;

d. a tubular-form, catalyst-retaining screen support member attached at its lower end to said reaction chamber and having at its upper end a ring flange, said catalyst-retaining screen support member ring flange being in contact with said catalyst-retaining screen ring flange and forming a movable slip joint connection therewith;

e. a tubular-form, dam attached to said screen support member ring flange, coaxially distended a finite distance above the movable slip joint connection, and a finite distance below the upper portion of said chamber, and having a nominal internal cross-sectional area less than said catalyst-retaining screen and greater than said center-pipe, to provide a semi-closed annulus within the lower portion of said catalyst-holding zone; and, f. particulate refractory matter of a size larger than said catalyst particles, disposed within said semi-closed annulus from the movable connection to a height below the top edge of the dam.

2. The reactor system of claim 1 further characterized in that said tubular-form dam is perforated.

3. The reactor system of claim 1 further characterized in that said reaction chamber, catalyst-retaining screen, screen support member, centerpipe and plate are substantially circular.

4. The reactor system of claim 1 further characterized in that said particulate matter is disposed in multiple layers of varying sized particles.

5. The reactor system of claim 4 further characterized in that the size of said particulate matter decreases as the height thereof increases.

6. The reactor system of claim 1 further characterized in that said particulate matter is substantially spherical in shape.

7. The reactor system of claim 1 further characterized in that said refractory particulate matter is ceramic.

* * * * *